United States Patent [19]

Guirguis

[11] Patent Number: 4,646,515
[45] Date of Patent: Mar. 3, 1987

[54] TWO-PHASE ENGINE

[76] Inventor: Raafat H. Guirguis, 5516 Starboard Ct., Fairfax, Va. 22032

[21] Appl. No.: 817,811

[22] Filed: Jan. 10, 1986

[51] Int. Cl.[4] .............................................. F02C 3/30
[52] U.S. Cl. .................................. 60/39.35; 60/39.57; 123/19
[58] Field of Search ................ 60/39.34, 39.35, 39.53, 60/39.57, 39.465; 123/19

[56] References Cited

U.S. PATENT DOCUMENTS

| 965,985 | 8/1910 | Brockhausen. | |
|---|---|---|---|
| 1,094,919 | 4/1914 | Nash | 123/19 |
| 1,206,001 | 11/1916 | Kuhl. | |
| 1,337,323 | 4/1920 | Ostenberg. | |
| 1,677,198 | 7/1928 | Naileigh. | |
| 1,853,869 | 4/1932 | Marks | 60/39.34 |
| 2,469,678 | 5/1949 | Wyman. | |
| 2,865,172 | 12/1958 | Bodde. | |
| 3,990,228 | 11/1976 | Bailey. | |
| 4,031,697 | 6/1977 | Adair | 60/39.35 |
| 4,304,095 | 12/1981 | Rasamen. | |

FOREIGN PATENT DOCUMENTS 315191  3/1917  Fed. Rep. of Germany ..... 60/39.57

Primary Examiner—Louis J. Casaregola
Attorney, Agent, or Firm—Roylance, Abrams, Berdo & Goodman

[57] ABSTRACT

An engine includes an elongated shaft, a housing mounted about the shaft with the shaft being rotatable relative to the housing about the shaft longitudinal axis, a conduit fixed to the shaft within the housing filled with an inert motive liquid and nozzles for inducing combustible gas bubbles in the motive liquid. The conduit has a compression section extending generally radially from the shaft, a combustion section extending generally axially and parallel to the shaft and from the compression section at a radial distance from the shaft, and an expansion section extending from an end of the combustion section remote from the compression section. The bubble nozzles are located before the inlet of the compression section.

17 Claims, 3 Drawing Figures

TWO-PHASE ENGINE

FIELD OF THE INVENTION

The present invention relates to an engine employing a liquid as motive fluid wherein combustible gas bubbles are induced into the liquid, compressed and then ignited. Expansion of the bubbles subsequent to ignition drives the motive fluid which drives the engine. More particularly, the present invention relates to a two-phase engine wherein the motive liquid and gas bubbles pass through a radial compression section, a combustion section spaced radially from the shaft where the gas bubbles are ignited and an expansion section extending from the combustion section. The engine allows the gas in the bubbles to go through a thermodynamic cycle.

BACKGROUND OF THE INVENTION

A conventional gas turbine supplies both water and an explosive mixture to the interior of a housing. The explosive mixture is then ignited forcing the water and exhaust gases along a bell shape member, through an opening and against a set of blades causing rotation of a shaft. Suchg arrangement is disclosed in U.S. Pat. No. 1,206,001 to Kuhl.

Another liquid and gas turbine is disclosed in U.S. Pat. No. 965,985 to Brockhausen. This turbine combines the explosive power of a gas with water to generate power. Bubbles of the gas are formed in the water and are then ignited adjacent a water wheel to rotate the water wheel.

These conventional devices are not properly classified as engines since they do not permit the gas to go through a thermodynamic cycle, and thus, cannot produce work on a continuous basis. Additionally, no practical systems are provided to ignite bubbles moving in the motive liquid.

SUMMARY OF THE INVENTION

An object of the present invention is to provide an engine, particularly a two-phase engine which operates at high efficiency, produces less pollutants than conventional engines, and can run with different fuels and at different fuel-to-air ratios for each of the various fuels without knocking.

Another object of the present invention is to provide an engine having negligible consumption of oil.

A further object of the present invention is to provide an engine which does not need separate cooling, has virtually no wearing components, is smaller than conventional engines, and can achieve a high level of power output.

A still further object of the present invention is to provide an engine which is simpler and less expensive to manufacture and maintain.

The foregoing objects are obtained by an engine comprising an elongated shaft, a housing mounted about the shaft with the shaft rotatable relative to the housing about the shaft longitudinal axis, a conduit within the housing and fixed to the shaft, and bubble means. The conduit has a compression section extending generally radially from the shaft, a combustion section extending generally axially and parallel to the shaft and from the compression section at a radial distance from the shaft, and an expansion section extending from the end of the combustion section remote from the compression section. The conduit is filled with a relatively inert motive liquid. The bubble means is located adjacent an inlet of the compression section and induces bubbles of combustible gas into the motive liquid in the combustion section.

In this manner, the gas bubbles are compressed as they move through the compression section, and are ignited in the combustion section. The ignited bubbles and the compressed motive liquid then pass through the expansion section where the bubbles expand in a manner to produce usable power.

By forming the combustion chamber as a gas bubble in a motive liquid, such as water, the efficiency of the engine is increased, while reducing the production of pollutants. The forces generated by the expanding bubbles are transmitted directly to the liquid. This eliminates the use of sliding parts providing a more efficient transmission of energy. Mechanical friction is negligible. The hydrodynamic losses are small since the motive liquid is essentially incompressible and since compression is achieved by body forces.

Preferably, the shaft rotates while the housing is fixed. An impeller can define the conduit and can be fixedly mounted on the shaft for simultaneous rotation within the fixed housing. Angularly offset blades at the exit of the conduit can be used to produce torque.

Other objects, advantages and salient features of the present invention will become apparent from the following detailed description which, taken in conjunction with the annex drawings, discloses a preferred embodiment of the present invention.

BRIEF DESCRIPTION OF THE DRAWINGS

Referring to the drawings which form a part of this disclosure.

DETAILED DESCRIPTION OF PREFERRED EMBODIMENTS

Figure 1:
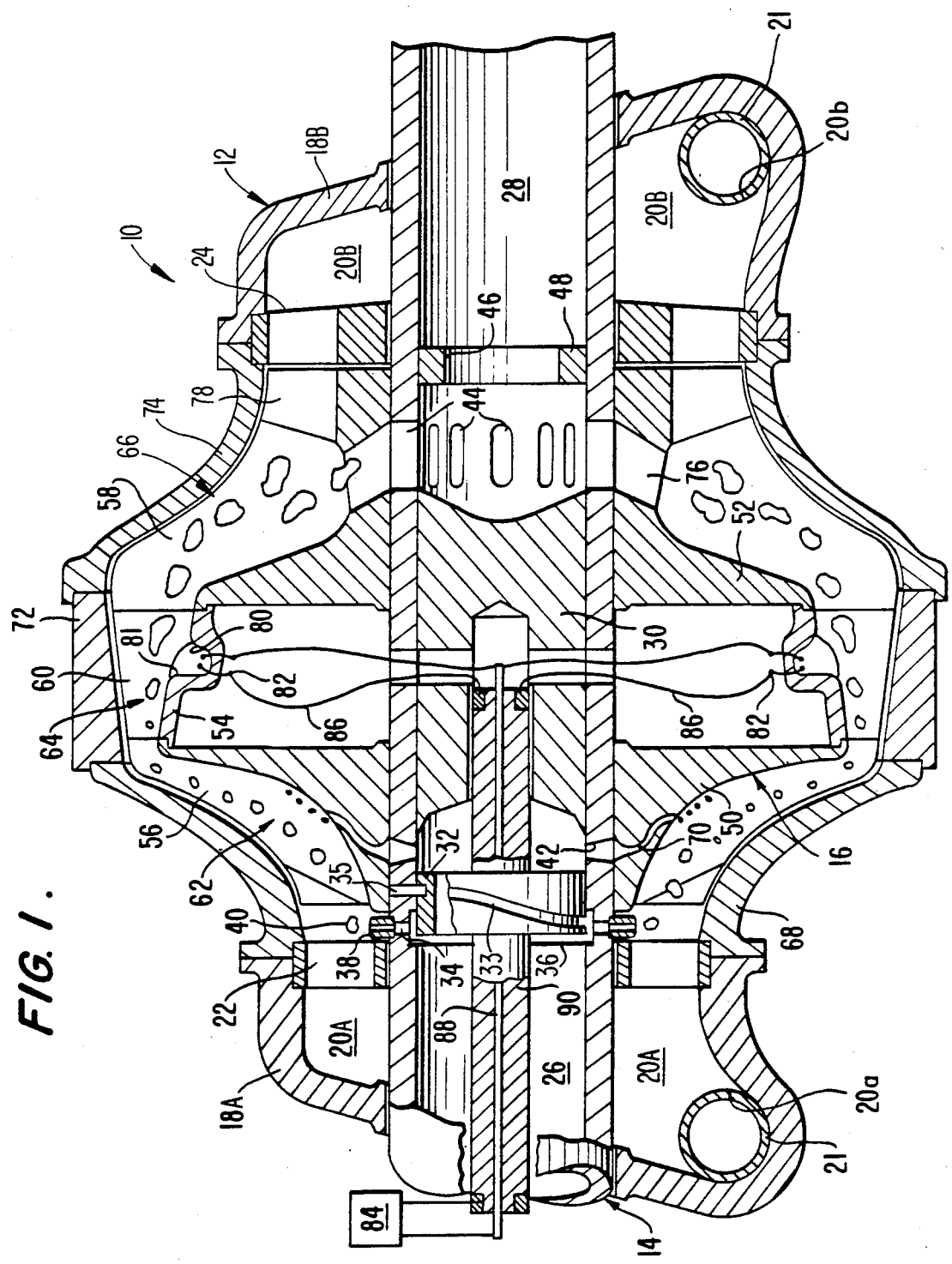
FIG. 1 is a side elevational view of an engine according to a first embodiment of the present invention.

Referring initially to FIG. 1, the present invention involves a two-phase engine 10 comprising a relatively stationary housing 12 and a rotatable hollow shaft 14. A rotor 16 is fixedly mounted on the shaft for simultaneous rotation with the shaft about the longitudinal axis of the shaft and relative to housing 12. Housing 12, rotor 16 and shaft 14 define a conduit which is generally U-shaped in longitudinal cross section. The conduit is filled with and conveys an inert motive liquid and combustible gas bubbles. The combustible gas bubbles are compressed, ignited, and then expanded with the liquid. The bubbles' expansion drives the liquid at a higher velocity through the angularly offset conduit exit producing rotation of the rotor and shaft in the housing.

Housing 12 comprises a plurality of parts that are fixedly secured together. The housing is mounted in a support such that it is relatively fixed or stationary. The housing end sections 18A and 18B define axially volute passageways 20A and 20B connected for recirculating the motive liquid through an external pipe 21. Pipe 21 connects outlet 20b to inlet 20a. Stationary inlet blades 22 and stationary exit blades 24 guide the motive liquid to smoothly enter and exit. Inlet blades 22 and exit blades 24 are fixed to housing 12 and circumscribe the rotor.

The hollow interior of shaft 14 defines an inlet gas conduit 26 and an exhaust conduit 28. Conduits 26 and 28 are separated by a block member 30, preventing fluid communication between these two conduits. Sleeve 32 is adjustably mounted in the inlet conduit 26 of shaft 14. The adjustment of sleeve 32 can be accomplished by a cam groove 33 in the outer surface of the sleeve, which groove mates with a radially inwardly projecting pin 35 mounted in shaft 14. Sleeve 32 can be rotated relative shaft 14 using shaft 90. Rotation of sleeve 32 relative to shaft 14 moves the sleeve axially within the shaft. Shaft 90 should be splined at the connection with sleeve 32, such that sleeve 32 rotates with but can move axially relative to shaft 90.

Adjacent sleeve 32, shaft 14 has a plurality of inlet ports 34 which extend radially through the shaft and are circumferentially arranged about the shaft. The inner ends of ports 34 communicate with inlet conduit 26 through an annular groove 36. The position of sleeve 32 is adjusted relative to groove 36 to control the rate of bubbles induced in the motive fluid stream, and thereby, the engine power. The outer ends of inlet ports 34 terminate in nozzles 38 extending slightly into the liquid conduit to facilitate entrainment of bubbles in the liquid by creating a local region of lower pressure. The nozzles fine tune the bubble size. Combustible gas conveyed through inlet conduit 26 passes through groove 36, inlet ports 34 and nozzles 38, and is released into the motive liquid located about shaft 14 and rotor 16 and within housing 12 in the form of combustible gas bubbles 40.

Downstream of inlet ports 34, ports 42 are formed in and circumferentially arranged about shaft 14. Ports 42 facilitate the collection of bubbles that are not properly conveyed through the engine for combustion.

Exhaust ports 44 are located in shaft 14 on the opposite side of block member 30. The exhaust ports extend radially through the shaft and are circumferentially arranged about the shaft. Exhaust ports 44 are in fluid communication with exhaust conduit 28 through an aperture 46 in plate 48. Plate 48 serves to constrict the flow of exhaust gases from the engine. Plate 48 can be adjusted axially relative to ports 44 during engine operation.

The downstream end of exhaust conduit 28 can be coupled to a suitable downstream exhaust system.

Rotor 16 comprises a front impeller 50 and a rear impeller 52. The impellers are arranged back-to-back and are rigidly connected by a generally annular combustion ring 54. Impeller 50 has radially extending pump blades 56, while rear impeller 52 has radially extending turbine blades 58. Combustion ring 54 has radially extending blades 60. Blades 56, 58 and 60 are axially aligned in sets with the various sets being circumferentially spaced about rotor 16. This divides the fluid conduit between the rotor and housing into a plurality of circumferentially spaced sections spaced by the pump blades, combustion blades and turbine blades.

Blades 56 and 58 are curved such that the centrifugal force resulting from their curvature balances the Coriolis component of the acceleration. If the Coriolis component is not balanced, the buoyancy forces will push the bubbles toward the blades. Instead of moving near the center of the conduit, the bubbles in a radially straight conduit will drag along the walls of the conduit, which requires a higher liquid velocity to carry them against the buoyancy forces in compression section 62.

Each circumferential section of the fluid conduit is divided into three sections. A compression section 62, a combustion section 64 and an expansion section 66. Compression section 62 is tapered radially outwardly, i.e., reduces in height between the front impeller and the adjacent housing portion 68. This tapering accelerates the liquid flow, enhancing the liquid's ability to carry bubbles into combustion section 64 against the buoyancy forces in compression section 62. Openings 70 are formed between the blades in front impeller 50 to connect compression section 62 with the inlet conduit 26 through ports 42. Openings 70 and ports 42 permit gas bubbles trickling down the sloping front surface of impeller 50 to pass into inlet conduit 26.

Combustion ring 54 extends generally rearwardly and radially inwardly relative to the shaft longitudinal axis such that buoyancy forces prevent bubbles that have passed into combustion section 64 from trickling back in compression section 62. Similarly, the inner surface of the adjacent housing portion 72 extends rearwardly and radially outwardly. In this manner, combustion ring 54 and housing portion 72 define the radially inward and radially outward, respectively, peripheries of combustion section 64 such that combustion section 64 tapers forwardly or toward compression section 56.

Expansion section 66 extends rearwardly and radially inwardly from combustion section 64. The shape of rear impeller 52 and the adjacent housing portion 74 define expansion section 64 such that it tapers in a direction toward combustion section 64.

Rear impeller 52 has a plurality of exhaust openings 76 providing fluid communication between expansion section 66 and exhaust conduit 28 through exhaust ports 44. The exhaust gas in the bubbles is released through exhaust openings 76. The motive liquid exits through angularly offset blades 78 which are an integral part of blades 58 extending from impeller 52. From blades 78, the motive liquid passes between stationary blades 24 and into passageway 20B for recirculation to inlet blades 22 via pipe 21.

Combustion ring 54 has an intermediate recess 80. Recess 80 is generally annular, extends radially inwardly and opens in a radially outward direction. The upstream end of recess 80 is defined by a radially outwardly extending step 81. Step 81 creates a recirculation zone downstream of the step which assists in sustaining bubble combustion. Combustion blades 60 do not extend into recess 80, permitting communication between the circumferentially arranged conduits through recess 80. This communication equalizes the pressure at recess 80 between all the circumferentially arranged conduits. Thereby, the pressure at similar locations but in different conduits is also equalized to some extent throughout sections 62, 64, and 66. This equalization balances the pressure forces on the shaft and housing. It also equalizes the torque and power produced in all conduits for smooth operation.

A spark initiator 82 is located in recess 80 in each combustion section 64. Spark initiators 82 are connected to a high voltage source 84 by wires 86, and central shaft 88 extending through conduit 90. Shaft 88 is connected to the positive end of voltage source 84 and is insulated from shaft 90. All other parts of the engine are considered ground connection, and are connected to the negative end of voltage source 84 through shaft 90.

In operation, the space between housing 12 on one side and shaft 14 and rotor 16 on the other side is filled with inert motive liquid, such as water. The connection between the housing end sections 18 and shaft 14 are suitably closed with seals permitting relative rotation of the shaft, while preventing the escape of the water from the housing.

A combustible gas is conveyed through inlet conduit 26, through groove 36 and inlet port 34, and out nozzles 38 producing combustible gas bubbles at the inlet of compression section 62. Since rotor 16 including impellers 50 and 52 and blades 56, 58 and 60 rotate simultaneously with shaft 14, the pressure of the motive liquid in the compression section increases in a radially outward direction. As the bubbles are conveyed radially outwardly through the increasingly high pressurized liquid, they are compressed and are made smaller as they move in the direction of combustion section 64.

During the starting operation, the tube is rotated by a separate drive motor to initiate the initial flow of liquid through the motive fluid conduit. In the combustion section, the gas bubbles will tend to accumulate in recess 80 due to the large buoyancy forces directing the bubbles radially inwardly. The accumulation of gas bubbles in recess 80 will displace all of the liquid out of the recess until the recess is completely filled with combustible gases. After the recess is filled with combustible gas, additional bubbles will continue to flow through the conduit. A spark from spark initiator 82 will cause burning of the gas in recess 80 in a manner sufficient to start the combustion process.

Once a combustion process is initiated, it is self sustaining. The self sustaining bubble ignition occurs in one of two ways, or a combination of the two ways. The first way involves pressure waves generated when the bubbles ignite and travel locally in all directions igniting incoming gas bubbles. The shape of the combustion section and the compression section does not totally prevent the propagation of the pressure waves from passing into the compression section. However, the shape substantially weakens the pressure wave to an extent that the pressure waves propagated within the compression section are too weak to ignite any bubbles in the compression section. This particularly results from the divergency of the compression section toward its inlet and the centrifugal acceleration against which the waves have to propagate.

The second mechanism for the continuous combustion of the gas bubbles is the transfer of the hot products from one burned bubble to an adjacent unburned bubble. The transfer process is accomplished by small bubbles being ejected from a burned parent bubble. This transfer of the hot products from the burned to the unburned bubbles to ignite the unburned bubbles is enhanced by creating recirculation in the combustion zone, causing the burned and unburned bubbles to be relocated closer to each other. The recirculation increases the chances of the small ejected bubbles reaching the unburned bubbles.

As the burned bubbles expand, the motive liquid is accelerated in expansion section 66. The high velocity liquid passing through angularly offset blades 78 provides the necessary torque to cause the rotation of the engine.

The exhaust gases in the burned bubbles pass due to their buoyancy through openings 76, ports 44 and out exhaust conduit 28. The motive liquid passes into passage 20 and is recirculated back to the inlet to pass through inlet blades 22 and back into compression 62.

The net torque can be produced by the engine in one of two ways. In the first embodiment of FIG. 1, the angular offset of blades 78 is large enough to derive the whole net torque of the engine from shaft 14. In this case, blades 24 are fixed to the housing 12. They are guiding blades that angle the outgoing liquid flow to be efficiently collected in volute 20B.

Figure 2:
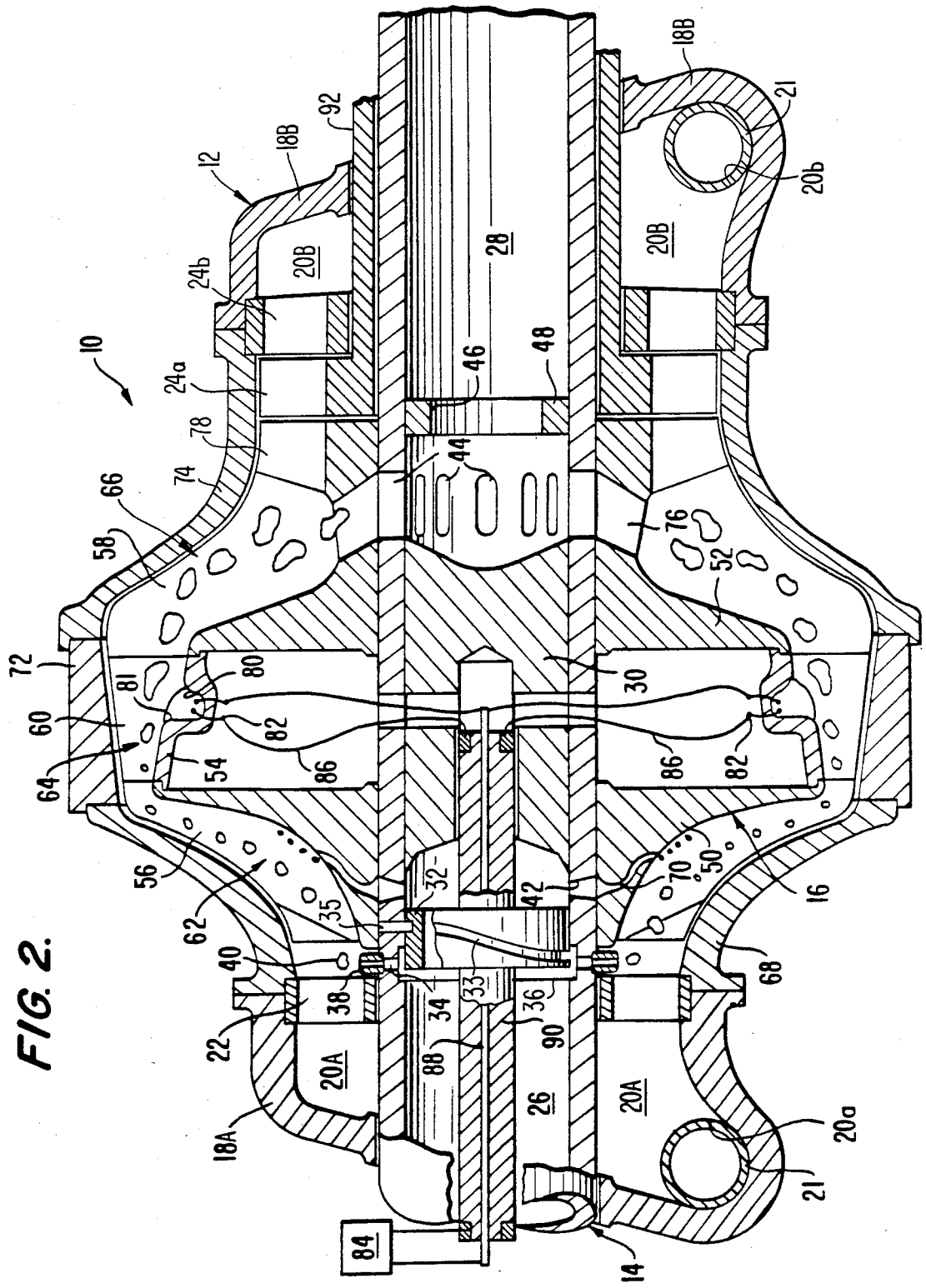
FIG. 2 is a side elevational view of an engine according to a second embodiment of the present invention.

In the second embodiment of FIG. 2, blades 78 are angularly offset just enough to produce the torque necessary to overcome the friction resisting the rotation of shaft 14. In this case, shaft 92 is mounted on bearings and allowed to rotate relative to both housing 12 and shaft 14. Shaft 92 becomes the main power shaft while 14 rotates freely. The angular offset of blades 24a should be then large enough to derive all the next torque. Blades 24a operate as an impulse turbine. A set of stationary blades 24b, located after blades 24a, guide the outgoing flow so that it smoothly enters the volute 20B. This is equivalent to having both engine and transmission mechanisms of a classical automobile engine within housing 12.

In either case, the same angular offset of the blades works smoothly at all shaft speeds since the engine is linear. In addition, the inertia of the rotating parts is so small, the power shaft would accelerate fast when sleeve 32 uncovers more of groove 36 allowing more bubbles to get into the main stream of liquid.

Figure 3:
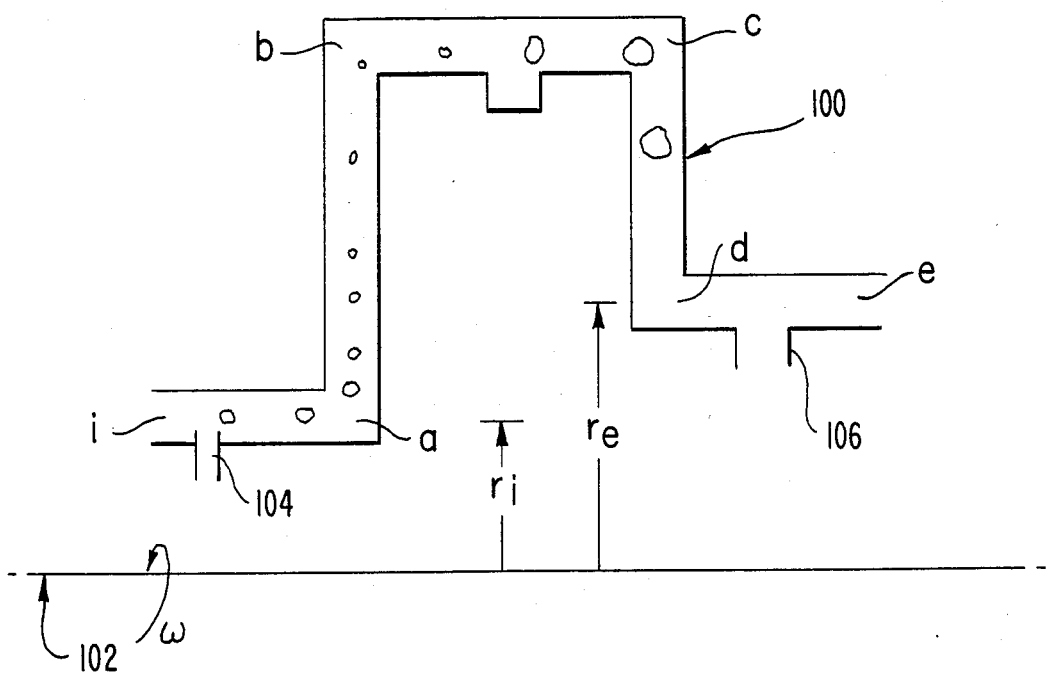
FIG. 3 is a schematic diagram of the engine of FIG. 1.

The invention will now be described in connection with the diagrammatic illustration of FIG. 3. In this illustration, the motive fluid engine conduit 100 is U-shaped in longitudinal section and is rotated at high speed about axis 102. The open end of the U-shape is directed toward the axis. Combustible gas bubbles are introduced into the inert motive fluid within the tube through port 104 between tube inlet i and point a. As the liquid flows from point a to point b, the liquid pressure increases due to the centrifugal forces. The liquid pressure is impressed on the gas bubbles which become highly compressed upon reaching point b. The bubbles are burned between points b and c within tube 100, and expand and accelerate the motive liquid. The liquid pressure decreases to its original level as it approaches point d in tube 100, permitting the bubbles to expand further. This decrease of pressure and further expansion of the bubbles additionally increases the velocity of the liquid, as the liquid exits at point e.

Points d and e are located on the same radius relative to axis 102. The exit at point e has a larger angular deflection than the inlet producing a net positive torque on the tube. Ideally, the exit angle should be adjusted to reduce the absolute velocity at the exit to that of the inlet. Liquid is then channeled towards the inlet in a separate tube after the burned gases are extracted through exhaust ports 106. Alternatively, the high kinetic energy of the high velocity liquid exiting the tube can be used to drive a separate impulse turbine, as explained above.

The bubbles have a negative buyoancy towards axis of rotation 102. The liquid velocity should be large enough to be able to carry the bubbles from point a to beyond point b. In other words, the liquid velocity in the tube should be larger than the terminal velocity of a bubble moving under the same buoyancy. Because of the large acceleration, the bubble terminal velocity, $$V_b \sim [0.5\ \omega^2 r\ d_b\ (\Delta\rho/\rho)]^{\frac{1}{2}} \qquad (1)$$

wherein subscript b denotes bubble and $\Delta\rho = \rho - \rho_b \sim \rho$. Assuming the largest radius of the impeller $r = 20$ cm, rotating at 10000 rpm, $\omega \sim 100$ radians per second, a bubble diameter of $d_b = 1$ mm will travel at $V_b \sim 10$ m/s, while a 1 cm diameter bubble travels at 32 m/s. The actual maximum terminal velocities will be lower because the value of $\Delta\rho/\rho$ is decreased as the bubble is compressed.

To drive the liquid at a velocity, V, a pressure difference $$\Delta p = \rho V^2 f(L/D) \quad (2)$$

is necessary, where f is the coefficient of friction, D is the tube diameter, and L is the hydrodynamic length equal to the tube length plus a few diameters to compensate for the hydrodynamic losses at the corners, inlet and exit of the tube. When bubbles are introduced in the flow, the hydrodynamic losses in the wake behind the bubbles between points a and b are added to equation (2). To drive the flow, the liquid is exited at a slightly larger radius, as illustrated in FIG. 2, such that $$\Delta p = \tfrac{1}{2}\rho\omega^2 (r_e^2 - r_i^2) \quad (3)$$

is equal to the pressure loss due to friction described by Equation (2).

The engine is described as linear since the velocity of the liquid in the tube, V, is proportional to $\omega$, as indicated in Equations (2) and (3), as long as the inlet and exit radii of the tube are fixed. Moreover, this velocity, V, can be adjusted to be always larger than $V_b$ to be sufficient to carry the bubbles beyond point b, since $V_b$ is also proportionl to $\omega$, as indicated in Equation (1).

A system that locates the bubbles to ignite them is not practical. The bubbles should ignite when they enter a combustion zone between points b and c. The pressure waves generated when bubbles ignite in turn ignite new bubbles. Additionally, small bubbles eject from burned bubbles which can further propagate combustion from one bubble to an adjacent bubble that is close enough to the parent burning bubble.

Pressure waves generated when a bubble ignites can travel backward. The combustion zone should be confined to the section of the tube between points b and c. Although the pressure waves cannot be prevented from propagating backward beyond point b, they can be weakened to a degree where they become unable to ignite any bubbles in the section between points a and b. This is already accomplished because these pressure waves have to propagate against an enormous acceleration (at 10000 rpm and r=20 cm, acceleration is $2\times 10^4$ g, with g=9.8 m/s$^2$) throughout section a-b. Additionally, section a-b of the tube can be divergent towards point a. This would also accelerate the flow toward point b and help the liquid flow to carry the bubbles against the large buyoancy effects at b.

Advantages of the present invention result from the combustion chamber being a gas bubble in water. As the gas bubbles are compressed from point a to point b, they have a large relative velocity opposite the direction of liquid flow, due to the buoyancy effects. This difference in velocity introduces an intensive circulation of the gases inside the bubble. Inside the bubble, the high relative velocity at the interface between the gases and the water, i.e., the surface of the bubble, combined with the mixing associated with the circulation, increases the heat and mass transfer level significantly.

As a bubble is compressed, its temperature tends to increase. The heat convection from the gases near the surface of the bubble to the water is enhanced by the evaporation process, preventing the water surface temperature from increasing. Because of the difference in density between the water vapor and the gases, the water vapor is carried to the centers of the vortices of the circulation in the bubbles. This cools the hot gases at those centers, and brings new unsaturated gases to the interface. Moreover, the bubble travels at a slower speed than the liquid flow, allowing more time for this cooling process.

The net result is that the temperature of the gas inside the bubble is not allowed to increase much more than the water temperature. This efficient cooling allows the increase of engine compression ratio, and thus, thermodynamic efficiency without autoignition. It allows use of different kinds of fuels. Finally, it decreases the level of $NO_x$ production.

The low level of pollutants results from several factors. Water vapor, $H_2O$, is added to the combustible gases, which produces less $NO_x$. Combustion occurs at a lower temperature producing less $NO_x$. The ignition process permits use of lean mixtures (outside the flamability limits), known generally to produce less pollutants.

The other main factor contributing to the high thermodynamic efficiency is that this engine is practically a binary-cycle engine. The energy lost when cooling a classical engine is partly recovered in the engine of the present invention. In a binary-cycle engine, the exhaust gases heat up the water in a separate water-vapor power-cycle. Here, both gas and vapor cycles are integrated. After the bubbles burn, they loose some of their energy to the water. When the water evaporates inside the bubble, it expands and does work on the liquid. The exhaust gases leave at a lower temperature. If the exhaust temperature is not low enough, the bubbles can be additionally cooled by designing longer b-c and c-d sections. Alternatively, the exhaust bubbles can be extracted just before the inlet, i, as the water is recycled, allowing the bubbles more time to heat the liquid and the water vapor more time to condense. Finally, the expansion of the burning gases is complete (to atmospheric pressure), being unlimited by a volume as in positive displacement engines.

The work of the expanding bubbles is transmitted directly to the liquid. There are no sliding parts to transmit the energy. Mechanical friction is negligible. The losses are mainly hydrodynamic, and are small for several reasons. Compression is achieved by body forces, and thus do not introduce any losses. Pressure waves propagating in the water produce minimal losses, since the water is nearly incompressible. The pump section, a-b, the combustor, b-c, and the turbine sections, c-d, are integrated into a single channel. This design eliminates the entry losses to the combustor and turbine.

Since the liquid velocities are all proportional to $\omega$, the velocity triangle at some inlet or exit becomes independent of $\omega$, when normalized by $\omega r$. If some blade angles are adjusted to insure a tangential inlet velocity relative to the blade at some $\omega$, it will insure a smooth inlet at all other $\omega$'s. The hydrodynamic entry losses are thus reduced to a minimum.

Because of the high rpm, compression and expansion are accomplished in a short length tube reducing the friction losses at the tube walls. A hydrodynamic loss results from the relative velocity between the liquid and the bubbles. The bubbles moving from a to b exert a drag against the liquid motion. Those moving from c and d add to the kinetic energy of the liquid. The force exerted equals the buoyancy, $\rho\omega^2 r\, v$, where v is the volume of the bubble. The energy transferred, $\int v\, \rho\omega^2 r\, dr = \int v\, dp$. The channel c-d should be designed to minimize the relative velocity between the bubbles and the liquid. Since buoyancy forces decrease towards point d and the liquid is accelerating there due to bubble expansion, this is already partly accomplished.

While a particular embodiment has been chosen to illustrate the invention, it will be understood by those skilled in the art that various changes and modifications can be made therein without departing from the scope of the invention as defined in the appended claims.

What is claimed is:

1. An engine, comprising:
   an elongated shaft extending along a longitudinal axis;
   a housing mounted about said shaft, said shaft being rotatable relative to said housing about said longitudinal axis;
   a conduit, within said housing and fixed to said shaft, having a compression section extending generally radially from said shaft, a combustion section extending generally axially and parallel relative to said shaft and from said compression section at a radial distance from said shaft and an expansion section extending from an end of said combustion section remote from said compression section, said conduit being filled with relatively inert motive liquid;
   bubble means, adjacent an inlet end of said compression section, for inducing bubbles of combustible gas into said motive liquid in said compression section;
   whereby the combustible gas bubbles are compressed during movement through said compression section, are ignited in said combustion section, and pass through said expansion section with said motive liquid.

2. An engine according to claim 1 wherein said expansion section extends generally radially relative to said longitudinal axis.

3. An engine according to claim 1 wherein said expansion section, fixed to said shaft for simultaneous rotation therewith, ends in angularly offset blades.

4. An engine according to claim 1 wherein said expansion section comprises an exhaust gas port adjacent said shaft.

5. An engine according to claim 1 wherein said compression section tapers in a radially outward direction.

6. An engine according to claim 1 wherein said bubble means comprises a combustible gas inlet port extending through said shaft.

7. An engine according to claim 6 wherein said shaft comprises a hollow section for conveying combustible gas to said inlet port.

8. An engine according to claim 12 wherein said combustion section comprises a radially inwardly extending start recess, said recess being generally annular and opening radially outwardly.

9. An engine according to claim 8 wherein said combustion section comprises ignition means for generating sparks in said start recess.

10. An engine according to claim 8 wherein said start recess is defined on an upstream end thereof by a radially outwardly extending shoulder.

11. An engine according to claim 1 wherein said combustion section tapers toward said compression section.

12. An engine according to claim 1 wherein said expansion section tapers toward said combustion section.

13. An engine according to claim 1 wherein said conduit is defined in a radially outward direction by said housing and is defined in a radially inward direction by impellers fixed to said shaft.

14. An engine according to claim 13 wherein said conduit is divided into a plurality of circumferentially spaced sections separated by radial blades extending axially relative along said longitudinal axis.

15. An engine according to claim 1 wherein said compression section has a liquid inlet spaced a first radial distance from said longitudinal axis; and said expansion section has a liquid outlet spaced a second radial distance from said longitudinal axis, said first radial distance being less than said second radial distance.

16. An engine according to claim 1 wherein said motive liquid is water.

17. An engine according to claim 1 wherein angularly offset turbine blades are rotatably mounted on said shaft at an outlet of said expansion section.

* * * * *